Patented Feb. 1, 1944

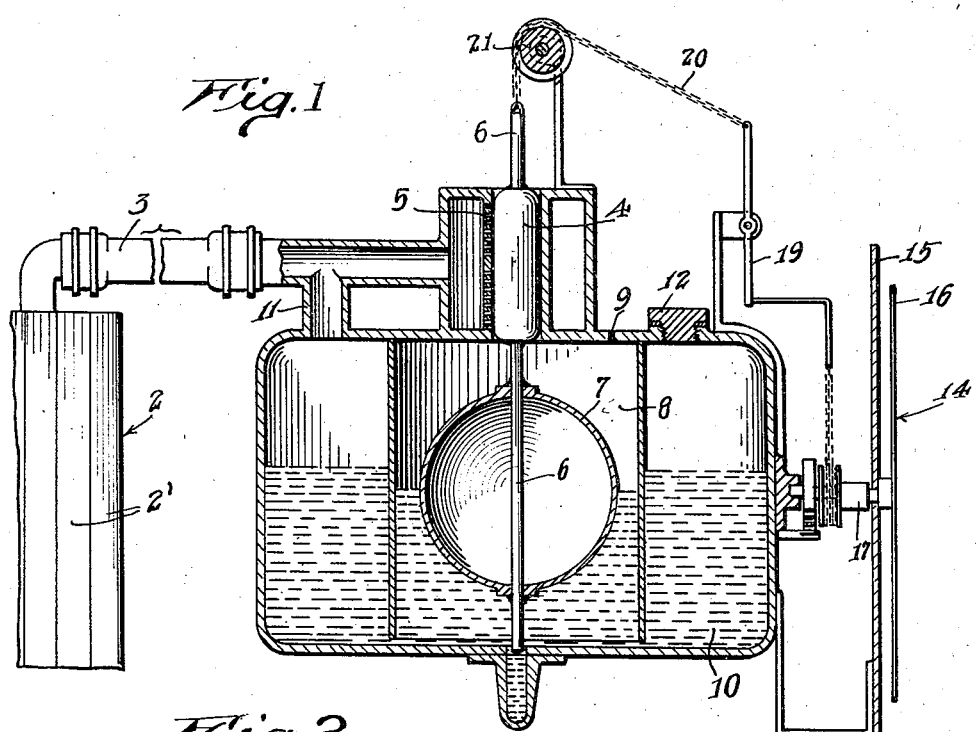
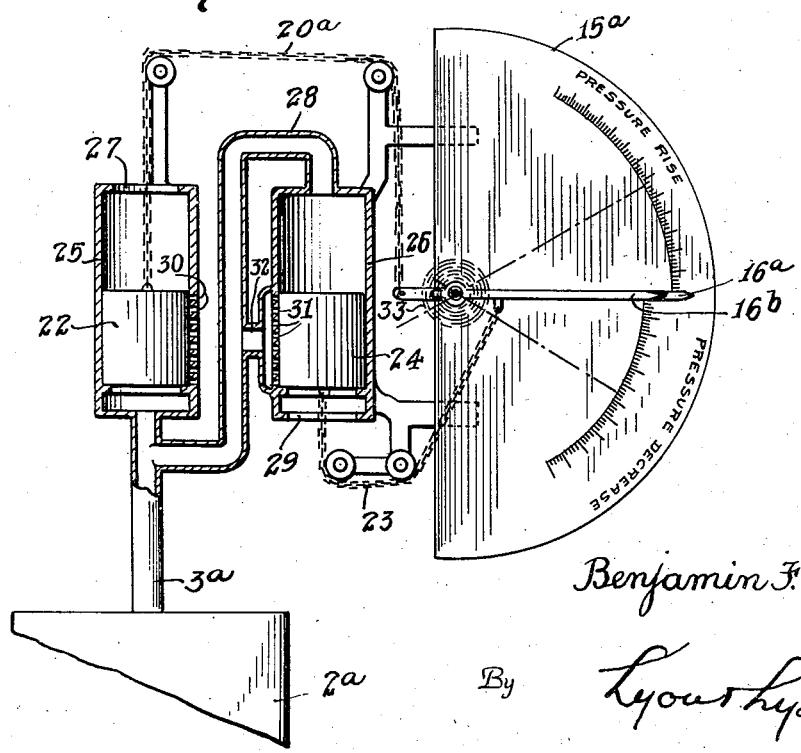

2,340,544

UNITED STATES PATENT OFFICE 2,340,544

INSTRUMENT FOR INDICATING THE RATE OF TEMPERATURE OR PRESSURE CHANGE

Benjamin F. Mahoney, Beverly Hills, Calif.

Application September 24, 1940, Serial No. 358,075

9 Claims. (Cl. 73—151)

This invention relates to an instrument for indicating the rate of temperature or pressure change.

A general object of the present invention is to provide an apparatus capable of providing a prompt indication of change of either pressure or temperature (depending upon whether the apparatus is used as a temperature or pressure change indicator), which apparatus is capable of operating over a wide range of either temperature or pressure and capable of affording a large and significant response in cases of minor variations in the temperature or pressure to be indicated. There are at present many needs for an indicating apparatus which is capable of indicating, for example, whether at the particular moment the atmospheric temperature is rising or falling. With an ordinary temperature indicating instrument one can determine whether the temperature has risen or fallen only by comparing the instant reading of the temperature indicator with some past reading. Furthermore, the temperature indicating equipment, if sensitive enough to indicate very slight changes in temperature is in general operative over but a narrow temperature range. For many purposes, it is desirable to have an instrument which is capable of indicating not only whether the temperature is rising or falling but also "the rate" at which the temperature at a particular instant may be rising or falling, and which instrument is capable of responding to very slight changes in temperature over a wide range of temperatures. The apparatus of the present invention may be optionally utilized to indicate either the rates of change of temperature or rates of change of pressure.

For example, in the operation of a soaring plane, the success of the operation may depend upon the pilot instantly recognizing when he is passing into an air stream of higher or lower temperature. An instrument on such a plane may have to operate through a very large range of temperatures.

By means of the present invention, I have provided an instrument which is capable of operating at any atmospheric temperature and which instrument will afford a zero reading at any temperature as long as the temperature of the atmospheric air remains constant, but which instrument is capable of giving promp indication not only of any change in atmospheric temperature and the value of the difference before and after the change, but also the rate of such change. My invention may be employed similarly to indicate changes in pressure in the atmosphere or in pressure artificially created and maintained. This information is at present derivable only by comparing the actual pressures indicated at different times. The instrument provided is adapted to give a zero pressure indication independent of the value of the instant pressure at the time as long as said pressure remains constant. Whenever the pressure undergoes any change, the instrument of the present invention will promptly afford not only a visual indication of the fact that the pressure has just changed and/or is changing (without requiring comparison with past readings), and the value of the change, but also will give an indication of the rate at which the pressure is changing.

The instrument of the present invention, together with various further valuable features thereof, will be readily apparent from the following description of the preferred form or forms of instrument embodying my invention. For this purpose, I have hereinafter described the preferred forms of the invention in connection with the accompanying drawing, in which—

Figure 1 is an elevation mainly in vertical section of one form of the invention.

Figure 2 is an elevation mainly in vertical section of a second form of the invention.

Referring to the drawing, the instrument includes a sealed air chamber 2. The sealed air chamber 2 may be of any preferred form of construction which includes an inner space to be occupied by atmospheric air. While the same device may be effectively employed to indicate both pressure and temperature changes, the walls of the vessel may be composed of material having a low rate of expansion with temperature change but flexible to respond easily to changes in pressure. The sealed air container 2 may where the same is to be employed in a temperature change indicator be provided with fins 2' whereby the same may more rapidly assume the temperature of the ambient, and is usually formed of relatively flat narrow shape in order to secure the greatest possible variation in the pressure of air in its inner air compartment in response to temperature variations in the ambient.

The sealed air container 2 is connected by a line 3 of any desired or preferred construction with an instrument so designed as to give an indication of any movement of air from within the container 2 to the ambient or vice versa and at the same time to indicate the rate of such movement. Said instrument comprises a valve member 4 capable of regulating the rate of discharge of air from the chamber 2 to the ambient or vice versa the rate of passage of air from the ambient to the chamber 2. For this purpose, the member 4 is movable past a plurality of fine ports 5 arranged in a vertical series. As the member 4 lowers, for example, the upper of said ports is free to allow for the passage of air from the atmosphere to the chamber 2, and as the member is succeedingly lowered a correspondingly increased number of such ports is opened, allowing for an increased rate of passage of air through the ports. On the other hand, where the member 4 is elevated, the lower ports of the series are opened for passage of air from the chamber 2 to the atmosphere, and the higher the member 4 is raised the greater the area of the ports which are opened for the passage of such air.

The vertical movements of the member 4 are similarly controlled by any difference in pressure in the air in the chamber 2 and the air pressure in the ambient. Various means of so effecting the movement of the member 4 may be employed. In the particular instrument illustrated, in Figure 1, the member 4 is indicated as mounted upon a rod 6, which rod 6 also mounts a ball-shaped float 7 floating on liquid in an inner compartment 8. The inner compartment 8 is vented to the atmosphere, as indicated at 9. The inner compartment 8 communicates at its lower end with a concentric surrounding compartment 10, which is sealed from the atmosphere and which is indicated as communicating through line 11 with the line 3 leading to the sealed air chamber 2. The outer compartment is indicated as provided with a cap 12, by means of which the same may be filled with liquid to the desired elevation.

The valve member 4 is illustrated as connected to an indicator means 14. The specific design of the indicator means may, of course, undergo wide variation. The particular indicator means illustrated comprises a dial 15 across which a pointer 16 is adapted to move, the pointer 16 in turn being mounted upon a shaft 17 connected to one end of a pivoted lever 19. The opposite end of the pivoted lever 19 is connected by a chain 20 over a pulley 21 with the upper end of the rod 6 which mounts the valve member 4. By this means, any vertical movement of the valve member 4 is transmitted to a movement of the pointer 16 with respect to the dial 15.

When used as a temperature change indicator the operation of my invention is briefly described as follows: A rise in temperature in the ambient with respect to the temperature of the air within chamber 2 is immediately transmitted to the air within the chamber to cause expansion of the volume of air in said chamber with the result that a slight pressure will be placed on the line 3. This pressure will force the liquid in the outer compartment 10 downwardly, raising the liquid in the inner compartment 8. The float 7 is correspondingly raised, and likewise the valve member 4 is raised. This permits the discharge of air to the atmosphere through the fine ports 5, controlled by the valve member 4, and vent 9. The value of the pressure in the chamber 2 determines the extent of the upward movement of the valve member 4 and, accordingly, the indication of the pointer 6. The dial 15 may be graduated in suitable legends indicating the rate of temperature change.

It will be seen that whatever the temperature is, the passage of air from the atmosphere to the sealed air container 2 or vice versa will occur only during a change in temperature. If the temperature in the ambient of chamber 2 rises, for example, to a new high temperature, the instrument will indicate promptly the change in temperature; but if the new temperature of the ambient remains constant, the pressure in the chamber 2 promptly reaches that of the atmosphere. The pressure differential between compartments 8 and 10 becomes zero. The valve member 4 promptly returns to the neutral position, and the indicator 6 again indicates on the dial 15 the fact that the temperature is for the moment constant.

Similarly, a decrease in temperature by contracting the volume of the air in the chamber 2 will cause a partial vacuum therein, whereupon atmospheric pressure forces liquid in the inner chamber 8 downwardly and in the outer chamber 10 upwardly. The valve member 4 will be moved downwardly carrying the indicator therewith. The upper of the ports 5 will be opened for flow of air therethrough from the atmosphere into chamber 2. As long as the temperature is rising or falling at a uniform rate, the indications of the instrument remain constant.

Changes either in artificially created or atmospheric temperatures may thus be indicated, the only requirement being that the chamber 2 be located in the zone to be tested and that the inner chamber 8 be vented to a zone of substantially constant pressure, e. g., the atmosphere.

The device will operate in substantially the same manner in response to changes of pressure in the ambient of chamber 2, but inasmuch as the levels of the fluid in the chambers 8 and 10 is controlled by the pressures thereon, the pressure change indicated by the instrument will be that which exists between the zone in which the chamber 2 is disposed and the zone to which chamber 8 is vented. It will thus be seen that artificial pressure changes in a closed vessel may be measured by arranging the device with the chamber 2 within the vessel and chamber 8 vented to the atmosphere. In such use of the device differences between the pressures in the vessel and in the atmosphere will compress or cause expansion of the air within the chamber 2 and affect the level of the fluid in the device to actuate the indicator as described. Of course, for most favorable results in this use of the device, it is preferred that the walls of chamber 2 be more flexible than those of the preferred embodiment of a temperature change indicator.

Changes in atmospheric pressure may also be measured, but in this case the mechanism will operate in reverse. The dial may be arranged and calibrated accordingly. For more accurate results when used for this purpose, a more rigid-walled chamber 2 is desired. The operation of valve member 4 in such use of the device, will be effected in response to a rise in atmospheric pressure exerted on the fluid in chamber 8 by causing the fluid level therein to drop, and raising the fluid level in the outer chamber 10 until the pressure in chamber 2 equals that of the atmosphere. The coincidental operation of the float will be indicated by the needle 14 on the dial. A drop in atmospheric pressure will be similarly but conversely registered.

It will be obvious to those of skill in the art that a device embodying a relatively rigid container 2 may also be utilized to measure changes in artificially created pressures. Accurate results may be obtained in this use of the device by venting the chamber 8 to the pressures to be measured. The operation would be as described with reference to measurement of changes in atmospheric pressures.

Now, referring to Figure 2 of the drawing, I have indicated a somewhat modified form of the invention in which 2ª indicates the air container, the inner volume of which is occupied with air capable of variation with the change of either temperature or pressure. The air container 2ª is indicated as connected by the line 3ª to the indicating instrument. The indicating instrument comprises the dial 15ª and pointers 16ª and 16ᵇ. The pointer 16ª is indicated as connected by chain 20ª to a valve head 22 and biased by a spring 33 while the pointer 16ᵇ is connected by a second chain 23 to the second valve head 24. The valve member 22 is indicated for operating the pointer 16ª in one direction (for example, pressure rise), and the valve member 24 for operation of the pointer 16ᵇ in the opposite direction (for example, pressure drop). The valve member 22 is indicated as mounted within a cylinder 25 to be forced upwardly through said cylinder by a pressure within the air chamber 2ª in excess of atmospheric. The valve member 24 is indicated as mounted in the cylinder 26 to be drawn upwardly through said cylinder by a lower pressure existing in chamber 2ª than the pressure of surrounding atmosphere. For this purpose, the lower end of the cylinder 25 is connected to the line 3ª and the upper end opened as indicated at 27; whereas, the upper end of the cylinder 26 is connected by line 28 with the line 3ª and the lower end 29 of said cylinder 26 connected with the atmosphere.

The valve member 22 is designed to in one position cover a plurality of fine ports 30 or a narrow vertical slot, which ports or slot communicate with the surrounding atmosphere. Upward movement of the valve member 22 progressively increases the area of the ports which are available for establishing communication between the atmosphere and the line 3ª. The valve member 24 in normal position covers a plurality of ports or fine vertical slits 31 leading to a line 32 connected with line 28 leading to the air chamber 2ª. The exposure of the ports 31 by upward movement of the valve member 24 permits the passage of air from the opening 29 through such ports to the line 3ª.

In the operation of the instrument shown in Figure 2 (when the instrument is used as a pressure indicating instrument), a variation in the pressure in the zone to which the container 2ª is exposed causes compression or expansion of the walls of the sealed air container 2ª, placing the air therein under greater pressure or partial vacuum and forcing the valve member 22 or member 24 upwardly in accordance therewith to actuate the pointers 16ª or 16ᵇ respectively. If the valve member 22 is forced upwardly in response to greater pressure on container 2ª, the excessive pressure in chamber 2ª may be relieved through ports 30, the extent of the pressure change determining the degree of movement of the valve member 22. This condition continues only as long as the chamber 2ª is undergoing compression in response to the new pressure differential between the zone to which cylinder 25 is vented and the zone in which chamber 2ª is disposed. If the pressure to which the chamber 2ª is exposed becomes constant, the pressure theretofore created within chamber 2ª will be promptly relieved through ports 30, and pointer 16ª will be returned to zero. The device, preferably provided with a more rigid container 2ª, may be used to indicate pressure changes in the same manner as is the corresponding embodiment of Fig. 1. In such case the instrument is vented to the zone to be tested as will be obvious.

Upon a relative decrease in pressure on the container 2ª, vacuum is placed upon the valve member 24, tending to draw said member upwardly and progressively exposing the ports 31 for passage of air from the atmosphere to the chamber 2ª in order to equalize the pressure therein with that of the atmosphere. The pointer 16ᵇ is moved together with the movement of the valve member 24. The movements of the pointer 16ᵇ may be indicated on the dial 15ª in degrees of rate of pressure change.

By means of the apparatus of the present invention, an instrument is provided giving an instant visual indication of very slight changes in temperature or pressure, independent of a comparison of the instant temperature or pressure readings with those obtained at some previous time. Furthermore, the instrument indicates a zero or neutral position independent of whatever the specific temperature or pressure may be whenever such conditions are for the moment constant.

In order that the instruments will be assured of returning to the zero position, whenever the temperature or pressure of the ambient is undergoing no change, the valve members 4, 22 and 24 are made to provide a slight clearance with respect to the walls containing the vents in order that there will be in all cases some opportunity for equalization of the pressure within the air chambers with that of the surrounding atmosphere.

While the particular forms of the instrument herein described are well adapted to carry out the purposes of the present invention, it is to be understood that in practice various modifications may be made, and the invention includes all such modifications and changes as come within the scope of the appended claims.

I claim:

1. An apparatus of the character described, which apparatus comprises means forming a fluid holding chamber the pressure of which is variable under the condition to be measured in a zone outside of said chamber, means establishing a restricted communication between said chamber and said zone, a member movable with respect to the restriction in said communicating means, an indicator for indicating the movement of said member, and means for effecting movement of said member by the pressure within the chamber.

2. In an apparatus of the class described, a fluid holding chamber member the pressure of which undergoes change on change in temperature in its ambient, a restricted communication between the chamber of said member and said ambient, means controlled by the pressure condition within said chamber for restricting said communication, and an indicator responsive to said last means.

3. An apparatus of the class described, comprising a chamber, an inlet to said chamber, a variable restriction for said inlet, means including a vented compartment to actuate said variable restrictions operable in response to an excess of pressure in said chamber over the pressure in the zone to which said compartment is vented, and an indicator responsive to the operation of said variable restriction.

4. An apparatus for indicating the rate of temperature change, comprising a fluid holding chamber member responsive to temperature change for varying its fluid pressure, an inlet to said chamber, a variable restriction for said inlet, means controlled by the pressure conditions of said chamber for actuating said variable restriction, and an indicator responsive to the operation of said variable restriction.

5. An apparatus of the class described, comprising a sealed chamber member, a single opening therein, a restriction for said opening including a member movable to vary the fluid movement through said opening, fluid pressure actuated means for moving said member, means connecting said fluid pressure means to said chamber, and an indicator connected to said member.

6. An apparatus for indicating temperature change, comprising a fluid holding chamber member the pressure of which varies under temperature change, an inlet to said member, a valve member for restricting said inlet and movable for varying the restriction thereof, a float connected to said member, an indicator connected to said member, and a fluid containing member connected with said chamber member, fluid in said fluid-containing member being effective to variably support said float and actuate said valve member in response to pressure changes in said chamber member.

7. An apparatus for indicating pressure change of the atmosphere, comprising a chamber member to be exposed to the atmosphere and containing air the pressure of which is adapted to vary in response to the pressure change in said atmosphere, an inlet establishing communication between the atmosphere and said chamber, a variable restriction for said inlet, an indicator of rate of change responsive to said variable restriction, and means responsive to the differential pressure between the interior of said chamber and atmosphere for controlling said variable restriction.

8. In an indicating instrument, means forming a passageway having a valve chamber therein, valve means in said chamber controlling said passageway, means to move said valve means to open position in response to an increase or decrease of pressure in said passageway at either side of said valve chamber with respect to the pressure at the opposite side thereof, the extent of movement of said valve means being in proportion to the difference in pressure in said passageway at opposite sides of said valve chamber, and indicating means operatively connected to said valve means to indicate the degree of movement thereof.

9. In a device of the character described, a conduit, means to maintain a pressure condition within said conduit variable under the condition to be measured, means forming a restricted communication between said conduit and a zone outside of said conduit, valve means controlling said last-named means, and means actuated by an excess of pressure in either said conduit or said zone to open said valve means to relieve the pressure differential between the conduit and said zone whereby said valve means is returned to closed position.

BENJAMIN F. MAHONEY.